April 11, 1950 E. WILDHABER 2,503,894
VALVELESS TYPE ROTARY POWER UNIT
Filed Nov. 21, 1944 4 Sheets-Sheet 1

*INVENTOR:*
Ernest Wildhaber

April 11, 1950     E. WILDHABER     2,503,894
VALVELESS TYPE ROTARY POWER UNIT
Filed Nov. 21, 1944     4 Sheets-Sheet 2

*INVENTOR:*
Ernest Wildhaber

April 11, 1950   E. WILDHABER   2,503,894
VALVELESS TYPE ROTARY POWER UNIT
Filed Nov. 21, 1944   4 Sheets-Sheet 3

INVENTOR:
Ernest Wildhaber

April 11, 1950   E. WILDHABER   2,503,894
VALVELESS TYPE ROTARY POWER UNIT
Filed Nov. 21, 1944   4 Sheets-Sheet 4
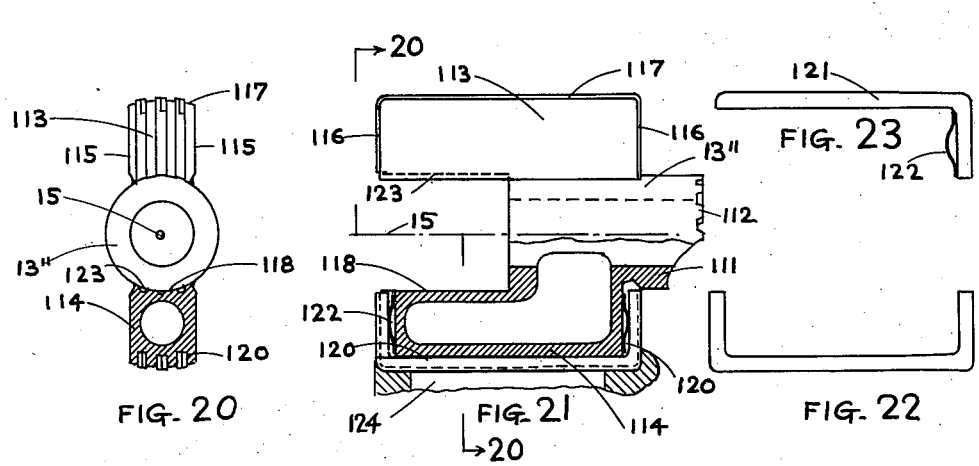
FIG. 20   FIG. 21   FIG. 22   FIG. 23
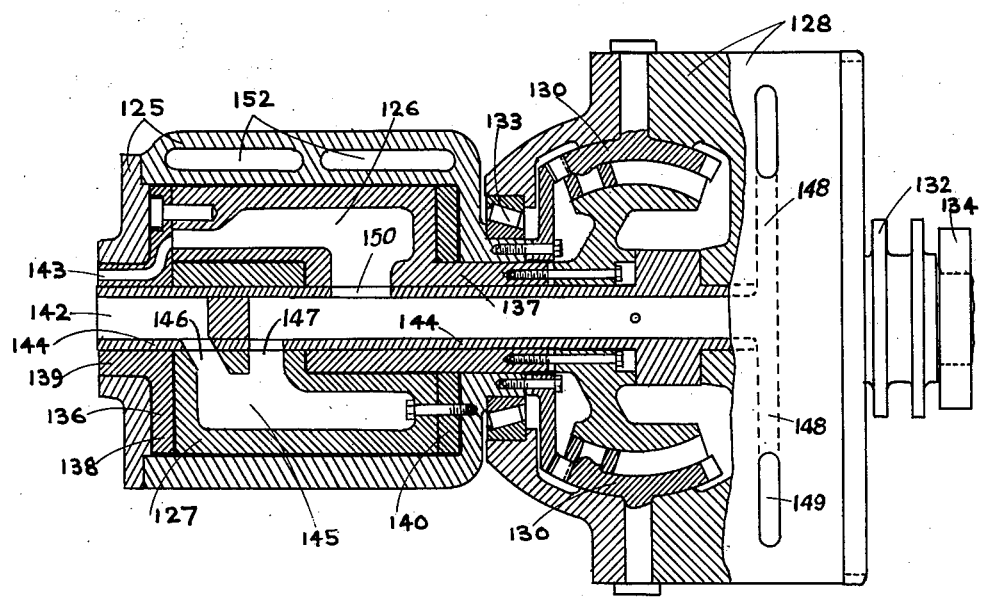
FIG. 24
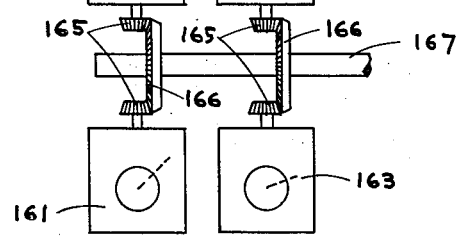
FIG. 25
INVENTOR:
Ernest Wildhaber Patented Apr. 11, 1950

2,503,894

UNITED STATES PATENT OFFICE 2,503,894

VALVELESS TYPE ROTARY POWER UNIT

Ernest Wildhaber, Brighton, N. Y.

Application November 21, 1944, Serial No. 564,518

11 Claims. (Cl. 103—129)

My invention relates to positive displacement machines in which a fluid medium is displaced, and may be embodied either as a motor or as a compressor or pump. It may be applied to internal combustion engines or motors, to steam engines or motors, to compressed air motors and to other motors which use a compressible medium or even an incompressible medium, such as liquids. Likewise it may be applied to air compressors, gas compressors in a broad sense, and to pumps for water or liquids.

One object of my present invention is to provide a new positive displacement machine of simple construction and moderate cost.

Another aim is to devise a positive displacement machine of moderate weight and of modest space requirement.

A further and important aim is to provide a positive displacement machine which can run efficiently at high speed.

A still other object is to devise an internal combustion engine of positive displacement type, as contrasted with the turbine type, which operates with the so-called four cycle process, and which requires neither valves nor sleeves.

A further object is to provide a double acting positive displacement machine which contains a minimum number of parts, and which can run efficiently in a wide range of speeds.

Other objects will appear in the course of the specification.

My invention employs a pair of coaxial rotatable members which rotate in a stationary housing and are oscillated relatively to each other on their axes as they rotate. In the preferred embodiments they are oscillated twice per full turn in the stationary housing. In all cases they are rotated an integral number of times per turn. They contain wing-like projections, which form pockets with one another in the housing. In the relative rotation of the two members, that is in their relative oscillation, the volume of each pocket is periodically changed. The pockets get larger and then smaller, and then larger again and so on. Their volume changes much like the volume enclosed between a cylinder and piston of a reciprocating engine, and in accordance with the present invention this change in volume is made use of for the same purposes. Machines of this character may be called positive displacement machines.

There are numerous ways of operatively connecting the relative oscillation of the two concentric members with their rotation. Preferably a third rotatable member is provided, which is coaxial with the two first named members, and which in normal operation rotates at a substantially constant speed. This member often contains a fly-wheel and serves to transmit power. It transmits power to the outside when the positive displacement machine is embodied as a motor; and it receives power from an outside source when the machine is embodied as a compressor or pump. Relative oscillation of the first named two members may be obtained by means of a further element or further elements which operatively interconnect the three coaxial members and a stationary element.

The stationary element may be embodied as a bevel gear concentric with said members. The said further elements may be planetary bevel pinions mounted in said power transmitting element and meshing with said stationary bevel gear. Relative oscillation of the first named two coaxial members is derived from said planetary pinions and may be effected by crank means operatively forming part thereof.

Preferably said two coaxial members are equally oscillated with respect to said power transmitting member, but in opposite directions, so that their speeds relatively to said power transmitting member are equal and opposite at any one instant. Complete mass balance is then readily obtained by making the moments of inertia equal on said two coaxial members.

With this simple procedure a better mass balance can be obtained than on comparable reciprocating engines; and perfect mass balance is an outstanding feature and aim of this invention. It is one of the factors which makes high speed operation possible. At the same time the positive displacement feature insures a very wide speed range.

Another factor contributing to high speed operation is the absence of valves, and the large inlet and outlet passages which are a natural characteristic of my invention.

In the preferred embodiments one turn of the power transmitting member corresponds to two complete oscillations of the first named two members, and is equivalent to two turns of the crankshaft of an engine of conventional reciprocating type. To obtain the same effect with such an engine the speed of the crank shaft would have to be geared down at a ratio of two to one, as is often done for airplane propulsion.

This characteristic of being in effect geared down is also an outstanding feature and aim in machines constructed in accordance with my invention, and is attained in a natural way and without adding parts.

Figure 1:
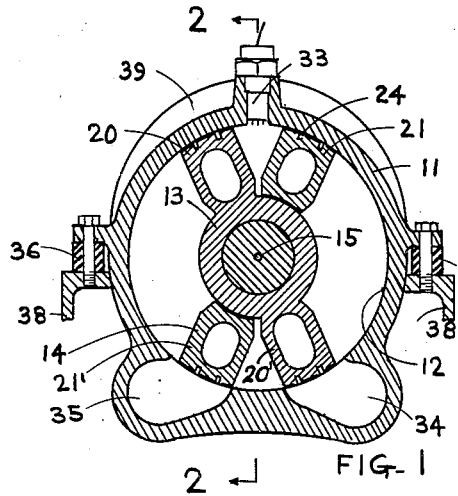
Fig. 1 is a cross section taken on the line 1—1 of Fig. 2 of a positive displacement machine constructed according to the present invention.
Figure 2:
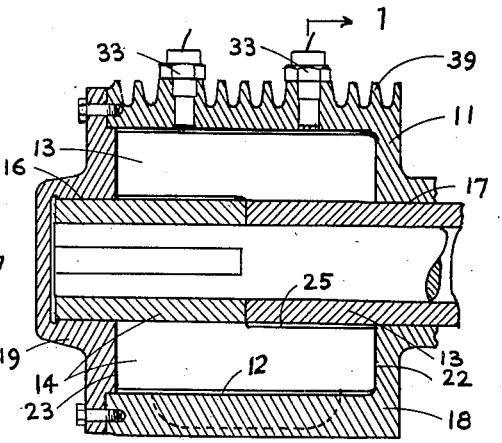
Fig. 2 is a partial axial section taken on the line 2—2 of Fig. 1 of this machine. It illustrates the two coaxial members, whose wing-like projections form pockets of varying volume, as said members rotate in the stationary housing and oscillate relatively to one another.

Figures 1 and 2 specifically illustrate an embodiment of an internal combustion motor of the four cycle type.

Figures 3 to 11 are diagrammatic sections similar to Fig. 1, that is sections taken at right angles to the axis of rotation. They show different turning positions and explain a fundamental principle underlying the present invention.

Figure 12:
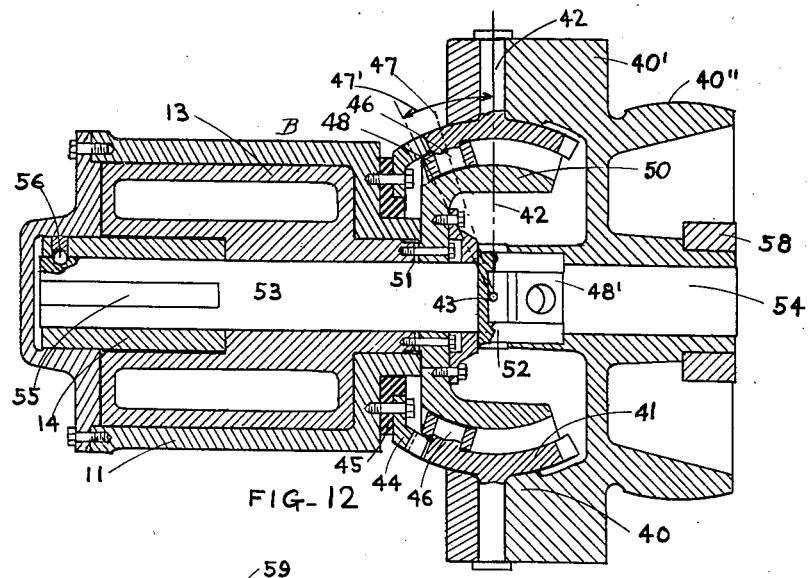

Fig. 12 is an axial section of a positive displacement machine embodying my invention and containing three coaxial members, one of which rotates at a substantially constant speed in normal operation while the other two coaxial members oscillate in opposite directions relatively to said one member.

Figure 13:
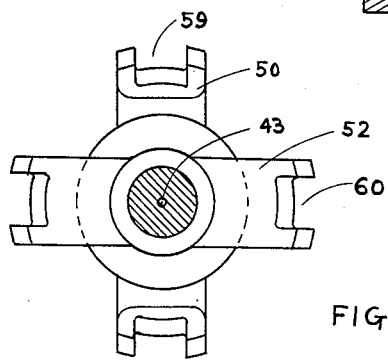

Fig. 13 is an axial view and section further illustrating parts of the machine shown in Fig. 12.

Figure 14:
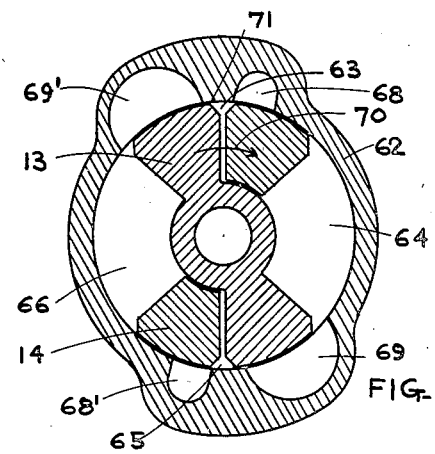

Fig. 14 is a cross section of an embodiment as applied to steam motors or compressed air motors.

Figure 15:
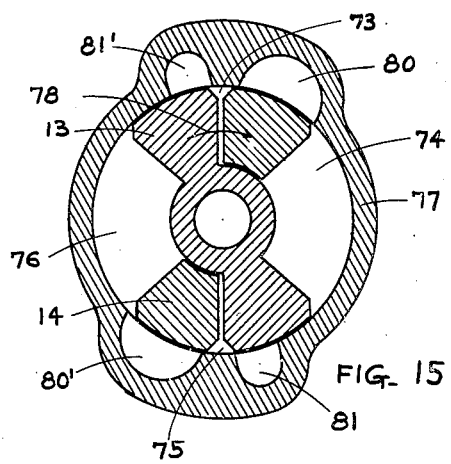

Fig. 15 is a cross section of an embodiment as applied to compressors or pumps for a compressible medium.

Figure 16:
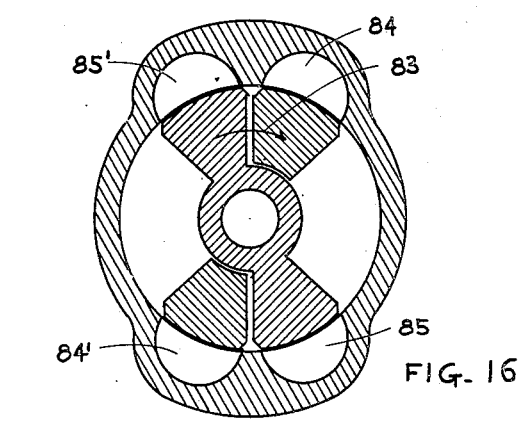

Fig. 16 is a cross section of an embodiment as applied to pumps for liquids.

Figure 17:
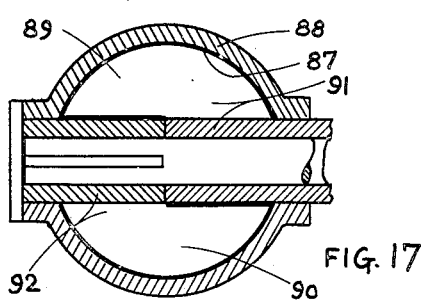

Fig. 17 is a partial axial section of a positive displacement machine constructed according to my invention, illustrating a modified shape.

Figure 18:
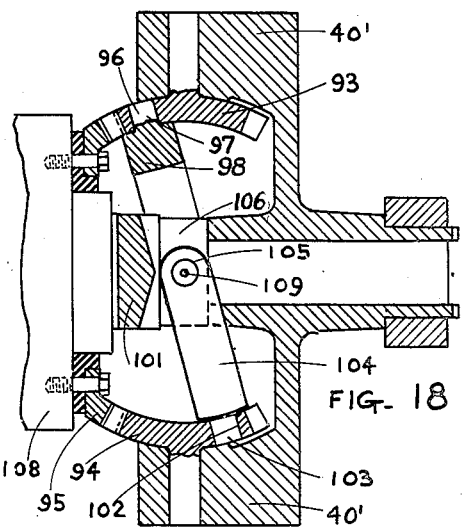

Fig. 18 is an axial section and partial view of a positive displacement machine constructed according to my invention, illustrative of a modified way of obtaining oscillation.

Figure 19:
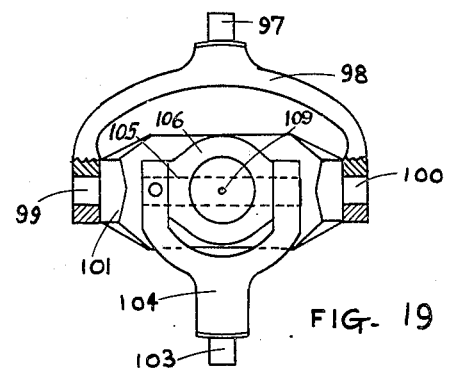

Fig. 19 is an axial view, partly a section, of parts shown in Fig. 18.

Fig. 20 is a view on the line 20—20 of Fig. 21, showing partly in section, partly in elevation looking along its axis, an oscillatory rotor, such as may be used in machines of my present invention.

Fig. 21 is partly an axial section, partly a view, corresponding to Fig. 20.

Fig. 22 is a view of a U-shaped sealing element, such as may be used on an oscillatory rotor of the character shown in Figures 20 and 21.

Fig. 23 shows a modified form of sealing element.

Fig. 24 is partly an axial section, partly a view, of a further embodiment as applied to internal combustion motors.

Fig. 25 is a diagram illustrative of a way of operatively connecting a plurality of individual motors or compressors constructed according to my invention.

Referring to Figures 1 and 2, numeral 11 denotes a housing hereafter called stationary, which contains an inside cylindrical surface 12. Two rotatable members 13, 14 are disposed coaxially with said surface, that is they have a common axis 15, which is also the axis of the cylindrical surface 12. Members 13, 14 are mounted on each other, and at 16 and 17 in said housing, which comprises a main body 18 and a cover 19 secured thereto by any suitable means, such as screws whose center lines are indicated by dash and dot lines in Fig. 2.

Members 13, 14 contain two diametrically opposite projections each, shown at 20, 20' and 21, 21' respectively. Their outside ends fit or nearly fit the inside surface 12 of the housing, and their sides also fit or nearly fit the sides 22, 23 of said housing.

The outside surface of the projections is here a cylindrical surface concentric with the axis of rotation, and it may contain grooves 24 which extend in axial direction. The grooves serve for sealing, that is to reduce leakage, and may also be provided on the sides 22, 23 and even on the inside 25.

The projections 20, 21; 21, 20'; 20', 21'; 21', 20 form pockets with one another and with the stationary housing. In the position shown in Fig. 1 the pockets 20, 21 and 20', 21' are small in volume; while the pockets 21, 20' and 21', 20 are large.

In accordance with the present invention the two members 13, 14 are made to rotate on their common axis, and as they rotate they are made to oscillate relatively to each other. One of said members or ordinarily both thereby turn at a varying rate on their axes. In the embodiments specifically illustrated there are two complete oscillations of the two coaxial members relatively to one another per full turn of said members on their joint axes. Broadly there is an integral number of oscillations per turn.

During these oscillations the above said pockets periodically increase and decrease in volume, as will now be further explained with reference to diagrams Figures 3 to 11. Pocket 26, which corresponds to pocket 20, 21 of Fig. 1, is singled out for observation. The center line 27 of the space or pocket 26 is shown in dotted lines. In the position shown in Fig. 3 the volume of the space or pocket 26 is a minimum.

As the members 13, 14 rotate on their common axis 28 they also turn relatively to each other, so that for a time member 14 turns more than member 13.

Figure 3:
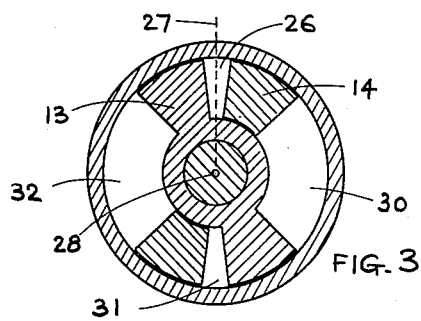
Figure 4:
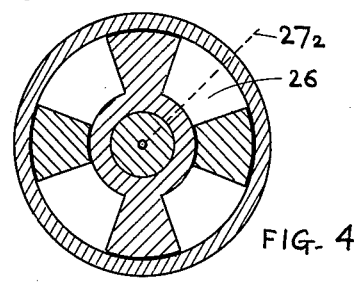

Fig. 4 shows a position $27_2$ of the center line of pocket 26, in which said center line includes an angle of 45° with its original position shown in Fig. 3. Here the volume of pocket 26 has grown substantially. Both members 13, 14 have moved in the same direction from the position shown in Fig. 3.

Figure 5:
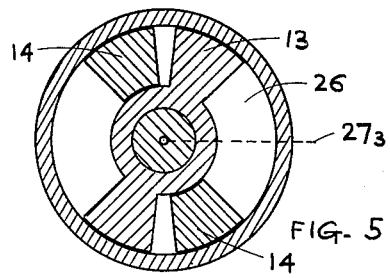
Figure 10:
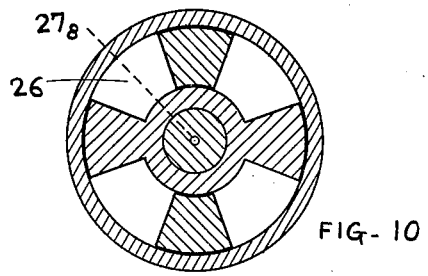

Fig. 5 shows a position $27_3$ of the center line of pocket 26, disposed at an angle of 90° to the original position. Here both members 13, 14 are turned in the same direction as before with respect to the preceding position, member 14 again having turned through a larger angle than member 13. Here now the volume of pocket 26 has become a maximum, and in this position both members turn for an instant at the same rate.

Figure 6:
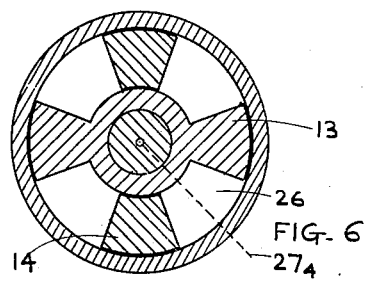

In the subsequent position $27_4$ of the center line of pocket 26 member 14 has slowed down as compared with member 13, so that the volume of the pocket has been reduced again, see Fig. 6.

In position $27_5$ of said center line, which includes an angle of 180° with the original position shown in Fig. 3, the volume of pocket 26 has again become a minimum, as it was in said original position. Between the positions 27 and $27_5$ of said center line, the volume of pocket 26 has changed from a minimum to a maximum and back again, that is it has gone through a complete cycle of change. And the two members 13, 14 have gone through a complete oscillation relatively to each other.

Figure 8:
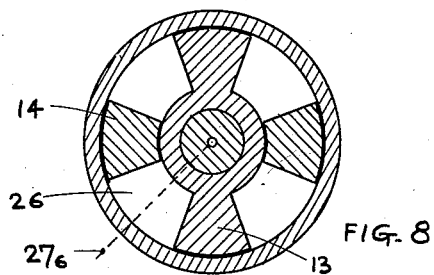

In the further subsequent positions $27_6$, Fig. 8; $27_7$, Fig. 9; $27_8$, Fig. 10 of the center line of pocket 26, the volume of the pocket increases again, becomes a maximum in position 27₇, then decreases again, and becomes a minimum again in position 27₉ of said center line. This position, Fig. 11, corresponds to a turning angle of 360°, that is a full turn of said center line; and this position is identical with position 27 shown in Fig. 3.

Between said two positions the two rotatable members 13, 14 also have been turned through 360°, that is through a full turn, and in the embodiment illustrated there have been two complete oscillations of the two members 13, 14 relatively to each other per full turn.

In the described full turn of the members 13, 14 and of center line 27 of pocket 26, the volume of said pocket changed substantially like the volume included between a piston and its cylinder of a reciprocating engine, per two turns of the crank shaft.

In other words there are two complete volume cycles per turn in the embodiment described.

Internal combustion engines or motors, of the so-called four cycle type, as widely used, operate with two complete volume cycles per cycle of operation, that is with two turns of the crank shafts. The same cycle of operation is gone through in a single turn of the drive shaft on internal combustion motors of the four cycle type, when constructed in accordance with my invention. This beneficial characteristic is further made use of in accordance with my invention: Valves and sleeves are done away with, and control of the cycle of operation is built into the stationary housing.

A complete cycle of operation of an internal combustion motor of the so-called four cycle type will now be described for the above said pocket 26.

Combustion starts, or just has started in a position where the volume of the pocket is a minimum. Let it be assumed then that combustion starts approximately in the position shown in Fig. 3. It continues for a brief time and expansion sets in as the volume of pocket 26 gets larger. Expansion continues in the position of Fig. 4, and ends or has ended in the position shown in Fig. 5, where the volume of pocket 26 is a maximum. The ratio of the maximum volume (Fig. 5) to the minimum volume (Fig. 3) may be called the compression ratio, and may be made the same as for reciprocating engines of the same character.

Figure 11:
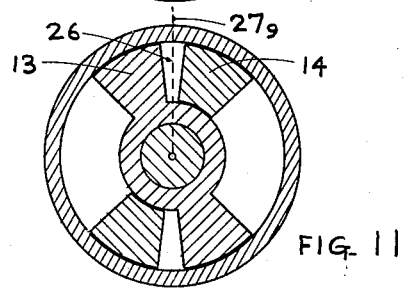

In position Fig. 5 the pocket 26 is connected or just has been connected with the exhaust duct. Exhaust continues through position Fig. 6 to position Fig. 7, where it ends or just has ended. In this position of minimum volume the combustion gases have been swept from pocket 26. Now the intake or suction begins, to draw air, or air and fuel mixture into the pocket (26) which now starts to expand. Intake continues through position Fig. 8 about to position Fig. 9, where the volume of pocket 26 has again become a maximum. Compression starts after this position. It proceeds in position Fig. 10 and continues to position Fig. 11, where combustion starts or has started. Fig. 11 is the same position as Fig. 3. The cycles of operation then go on as already described.

Figure 9:
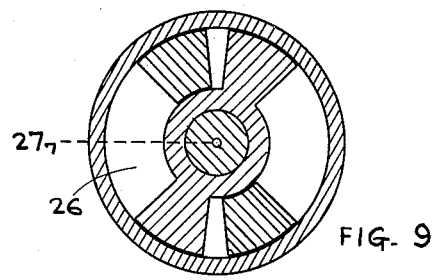
Figure 7:
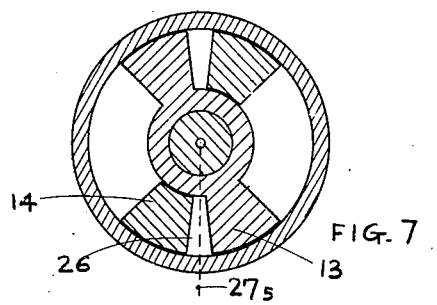

The four parts of a complete operating cycle of pocket 26 are therefore:

Intake, between positions Fig. 7 and Fig. 9;
Compression, between positions Fig. 9 and Fig. 11;
Combustion and expansion, between positions Fig. 3 and Fig. 5;
Exhaust, between positions Fig. 5 and Fig. 7.
The described operating cycle applies also to the other pockets, four in all in the embodiments specifically illustrated. The cycles of the other pockets are however differently timed, as is readily understood. Thus pocket 30, Fig. 3, is in the same position of operation as shown for pocket 26 in Fig. 5. Pocket 31, Fig. 3, is in the operating position shown in Fig. 7 for pocket 26. And pocket 32, Fig. 3 is in the operating position as shown for pocket 26 in Fig. 9.

The operating position depends on the turning position, turning position and operating position being coordinated.

Combustion sets in whenever a pocket is in the position shown in Fig. 3 for pocket 26. Thus it may be started by igniting means, such as for instance spark plugs 33 set into the motor housing 11, see Figures 1 and 2 which relate specifically to a combustion motor of the four cycle type. The igniting means are joint for all pockets. They operate successively in the different pockets. When the motor rotates as described for line 27 in Figures 3 to 11, namely in clockwise direction, the contents of the pockets are ignited in the order 26, 32, 31, 30, 26 and so on. A single spark plug can be used for the whole motor, if desired, which is the equivalent of a four cylinder reciprocating engine. If more than one spark plug 33 is provided, as indicated in Fig. 2, they operate at the same time, and simply provide more sparks in more places. Spark ignition affords a convenient way of timing control of the sparks, that is spark advance at high speeds. This timing control may be effected in the same way as customary on reciprocating engines.

Igniting means other than spark plugs may also be used if desired, namely any of the igniting means known for reciprocating engines.

As on reciprocating engines, ignition can also be obtained by high compression, in Diesel fashion. No spark plugs or other igniting means are then required.

Pocket 21, 20', Fig. 1, is in the same position as shown in Fig. 5 for pocket 26, that is in a position where exhaust just has started. This timing and function is accomplished by the position of exhaust duct 34 in housing 11, see Fig. 1, and it is noted that the connection between pocket 21, 20' and exhaust duct 34 has already been established in the position shown.

The said connection is quickly widened as rotation continues, namely clockwise rotation.

Pocket 20', 21' corresponds to the position shown in Fig. 7 for pocket 26, where exhaust ends and intake starts. The connection of pocket 20', 21' with exhaust duct 34 is just about closed, and a connection with the intake duct 35 is about to be established.

Like duct 34, the intake duct 35 is also stationary and built into the stationary housing 11. As on reciprocating engines of the same character, the intake duct may admit air which has been mixed with fuel in a carburetor or otherwise. Or in Diesel type motors, which operate with separate fuel injection, it admits air.

Connection between the intake duct 35 and pocket 20', 21' is rapidly established after further rotation from the position shown in Fig. 1.

Pocket 21', 20 is in the position shown in Fig. 9 for pocket 26. It has reached maximum volume and is filled with fluid from the intake duct, that is with air and fuel mixture, or merely air. It is being shut off from the intake duct and after further rotation compression starts.

Pocket 20, 21 is in the position shown in Fig. 3 for pocket 26.

The outstanding simplicity of my four cycle internal combustion motor is at once apparent. No cams, no cam shaft, no valves are needed here; all eight valves of a four cylinder motor are done away with. The operation is controlled by the position of two ducts in the housing, whose number compares with eight connecting ducts for said eight valves. Savings in space and weight are also accomplished.

Conventional motors of the reciprocating group, such as automotive motors, automobile engines, are usually mounted on ample rubber cushions, which increase the smoothness of operation. In one known procedure the engine is mounted so that it can tip within limits about an axis which passes through the center of gravity of the engine, which center is a substantial distance away from the turning center of the crank shaft.

Motors, and broadly positive displacement machines constructed in accordance with my invention permit a superior suspension, because the center of gravity is substantially on the axis of its rotatable members. They may be mounted on rubber cushions as indicated at 36 and 37 in Fig. 1, so that they may tip about the machine axis 15. The dash and dot lines which pass through cushions 36, 37 are intended to denote the center lines of screws or other known fastening means provided for so holding the housing on frame 38, that it can yieldingly tip within limits about axis 15.

In spite of the rocking motion of the housing permitted by the yielding suspension, and in spite of the fact that the housing may be mounted on a movable vehicle, car, boat or airplane, the housing will still be referred to as stationary, as is convenient and customary. The term stationary is understood to mean connected with the stationary or movable structure of which the machine forms a part. The connection may be direct or indirect, rigid or yielding.

The housing 11 of an internal combustion motor may contain cooling ribs 39, Figures 1 and 2, for cooling by air the part of the housing which tends to heat up in operation.

Means for tying up relative oscillation of the two coaxial members 13 and 14 with their rotation will now be described. A large number of such means exist to choose from, which ordinarily include a stationary element.

One embodiment of such means is illustrated in Figures 12 and 13, which apply broadly to positive displacement machines, that is to motors, compressors and pumps alike.

In this embodiment a rotary member 40 coaxial with the members 13 and 14 is provided. Member 40 is adapted to transmit power between the outside and the interior parts of the machine, and forms part of a fly-wheel 40' and also of a pulley 40''. When the machine is embodied as a motor, that is as a source of power, the pulley and a belt omitted in the drawing serve to transmit power to the outside. And when the machine is embodied as a power consumer, such as a compressor or pump, the pulley and belt serve to receive power from the outside. In both cases the power is transmitted through member 40.

Planetary bevel pinions 41 are mounted on member 40 with their axes 42 disposed at right angles to the axis of member 40 and intersecting said axis at 43. Pinions 41 mesh with a stationary bevel sun gear 44 arranged coaxial with member 40, and which may be secured to the stationary housing 11 of the machine.

An insulating ring 45, for heat insulation, may be provided intermediate the housing and sun gear 44, and bolted to the housing together with gear 44.

Bevel gear 44 and pinions 41 have a common apex at the point of intersection 43 of their axes, and their gear ratio is preferably two to one. In other words gear 44 contains twice as many teeth as a pinion 41. This means that the pinions make two turns per complete turn of member 40.

Broadly the tooth number of the sun gear is an exact multiple of the tooth number of a pinion, so that said pinion makes an integral number of full turns per complete revolution of the power transmitting member (40), on which said pinion is mounted.

The pinions 41 contain crank pins 46, whose center line 47 passes through the pinion apex 43 and includes an angle with the pinion axis 42 smaller than the pitch angle 47' of the pinion. A sliding block 48 is pivoted on each crank pin 46. It contains parallel plane sides, and may contain a spherical outside surface and a spherical inside surface both centered at apex 43. Said outside surface bears against the pinion body, and said inside surface bears loosely or freely against the spherical bottom of a groove whose plane sides engage the sides of the sliding block.

Two diagonally opposite grooves of this character are provided in a forked element 50, which is rigidly connected with member 13, that is with one of the two coaxial members which contain wing-like projections, and which in operation oscillate as they rotate. The connection may be by means of a toothed face clutch or coupling indicated at 51, and by screws indicated by their center lines, both means being of known construction.

Two other diagonally opposite grooves of the same shape are provided on another forked member or element 52, which is shown particularly in Fig. 13, and which is partially shown, in section and diagrammatic view, in Fig. 12. Element 52 may be formed integral with shaft projections 53, 54 coaxial with members 13, 14, 40, and is rigidly secured to member 14, such as by means of a keyway and key 55 which engages the hub of member 14. If desired the axial position of said hub on shaft 53 may be secured by means of a ball 56, which is admitted through a drilled hole plugged up afterwards and omitted in the drawing.

In other words the two forked elements 50 and 52 operatively form part of the two coaxial members 13 and 14 which are made to oscillate as they rotate.

The crank pins which operate said two elements 50 and 52 are differently timed. Their turning angle differs by 180°, so that the sliding blocks 48 engaging element 50 are always on the opposite sides of the plane of axes 42 as compared with the sliding blocks 48' engaging element 52. Thus when sliding blocks 48 are at one end of the slots, sliding blocks 48' are on the other end of their slots. In consequence the two members 13, 14 are always turned equally and in opposite directions relatively to member 40 on which the planets are mounted. Their speeds of oscillation relatively to member 40 are always equal and opposite and so are their accelerations.

The coaxial rotatable and oscillatory members 13, 14 are preferably dimensioned so as to have equal moments of inertia, and are preferably of symmetrical construction as shown. Their inertia forces are then completely balanced at all times for any constant speed of the machine. The individual inertia moments of the two members 13, 14 are opposite and equal at any one instant and balance each other completely. The mass balance is therefore superior to the mass balance attained on reciprocating engines of the same number of pockets, specifically on four cylinder engines.

Members 13, 14 are journalled in housing 11 and on each other, and shaft projection 54 which operatively forms part of member 14 is further journalled on the inside of member 40. The latter is journalled in a bearing 58 shown diagrammatically and on said shaft projection 54.

The grooves 59 of element 50, see Fig. 13, extend about an axis which passes through apex 43 and is perpendicular to the central plane of the grooves, that is perpendicular to the drawing plane of Fig. 12. Likewise the grooves 60 of element 52 extend about an axis passing through apex 43 and perpendicular to the central or median plane of the grooves. The groove surfaces can be considered as surfaces of revolution extending about said axes, which are perpendicular to the common axis of members 13, 14 and 40.

Fig. 14 illustrates an application of my invention to steam motors, compressed air motors and the like.

Here again two coaxial rotatable members 13, 14 are provided, which are adapted to oscillate as they rotate, and which may move in stationary housing 62 as described with reference to Fig. 12 and to Figures 3 to 11. In other words in the embodiment illustrated in Fig. 14 members 13, 14 perform two complete oscillations per full turn.

The cycle of operation corresponds here to a single complete oscillation, which is equivalent to a full turn of the crank shaft on reciprocating engines. Hence there are two cycles of operation per turn of members 13, 14 and per turn of the motor, that is of its member 40.

In the position shown in Fig. 14 pockets 63 and 65 correspond to pockets 26, 31 of Fig. 3 and have a minimum volume. Pockets 64 and 66 correspond to pockets 30 and 32 of Fig. 3 and have a maximum volume. The volume of the pockets periodically increases and decreases, as described with reference to Figures 3 to 11.

Housing 62 contains two diametrically opposite inlet ducts 68, 68' and two diametrically opposite outlet ducts 69, 69', all connected with the path of the winglike projections of members 13, 14. Pocket 63 is about to be connected with inlet duct 68, when members 13, 14 and uniformly rotating member 40 (see Fig. 12) turn in clockwise direction, as indicated by arrow 70. Steam or compressed air then enters said pocket from duct 68. This goes on for some time, until the forward end 71 of the projection of member 13 shuts off said connection. By that time the volume of pocket 63 has increased to an amount intermediate the maximum and minimum volume, and substantially smaller than the maximum volume. As rotation continues the volume of pocket 63 increases further, whereby expansion of the fluid takes place, that is of the steam or compressed air.

Immediately before the volume has increased to a maximum and pocket 63 has attained the former position of pocket 64, connection with outlet duct 69 is established. This is shown for pocket 64 in Fig. 14. The outlet duct stays connected with pocket 63 as rotation continues and as the volume of said pocket decreases again, until said pocket has nearly reached minimum volume and approaches the position of pocket 65 shown in Fig. 14. The connection with the outlet duct of pocket 63 is then shut off by the forward edge of the projection of rotatable member 13.

When in its rotation pocket 63 has reached the position shown for pocket 65, that is after rotation through a half turn, a cycle of operation has been completed. After further rotation it starts over again. The admission of fluid, such as steam or compressed air, is then controlled by inlet duct 68' and outlet duct 69'. A second cycle of operation is completed when pocket 63 has returned to its position as shown in Fig. 14.

In other words there are two cycles of operation per turn, that is one turn of the rotor corresponds to two turns of the crackshaft of a reciprocating engine of the same character.

In the embodiment illustrated in Fig. 14 the rate of expansion is so to say built into the motor, for the duration of admission of the fluid is controlled by the angular width of the inlet ducts 68, 68'. Expansion is obtained by providing inlet ducts which occupy a smaller arc of the circumference than the outlet ducts 69, 69'. Note also that an inlet duct 68 and an outlet duct are disposed adjacent each other, and that they together occupy less than half the circumference of the housing, that is of the path of the projections of coaxial members 13, 14.

The power output may be controlled by means of a valve disposed in the path of the medium to the inlet ducts, as is obvious.

In positive displacement machines of my invention an inlet duct and an outlet duct are disposed adjacent each other, and the inlet duct is displaced in the direction of rotation as compared with the adjacent outlet duct.

When said positive displacement machines are embodied as motors operated by a pressure medium, as described with reference to Fig. 14, the inlet duct occupies a smaller arc of the circumference than the outlet duct, provided that said medium is compressible.

When said machines are embodied as compressors, the inlet duct occupies a larger arc of the circumference than the outlet duct, as will now be further described with reference to Fig. 15.

Here also the two coaxial members 13, 14 contain wing-like projections, which form pockets 73, 74, 75, 76 with one another and with stationary housing 77. The volume of each of said pockets increases and decreases periodically as the members 13, 14 oscillate relatively to each other while they rotate.

In this embodiment, as in all embodiments of my present invention, each of the pockets undergoes the same cycle of operation, but not necessarily at the same time. In other words the timing is different. With this understanding a description of the operation of one pocket is a full description of the process.

In Fig. 15 pocket 73 is shown in a position of minimum volume. Upon slight rotation in the direction of arrow 78, connection of said pocket with inlet duct 80 is established, and remains so until the pocket has reached maximum volume, that is until it has reached the position shown in Fig. 15 for pocket 74. As rotation continues the volume of pocket 73 decreases again, whereby the air or other fluid in said pocket is compressed.

Thereafter connection of pocket 73 with the outlet duct 81 is established, and the compressed air or other fluid is expelled through said outlet duct until the pocket has reached its minimum volume. Pocket 73 has then attained the position shown for pocket 75 in Fig. 15. Members 13, 14 and the uniformly rotating member 40 have then completed half a turn.

The cycle is repeated in the subsequent half turn, with ducts 80' and 81' serving as inlet and outlet ducts respectively. This operation takes place over and over again during the further turns, and successively in all four pockets.

Fig. 16 illustrates an embodiment of my invention as applied to pumps for liquids, that is for substantially incompressible fluids. With clockwise direction of rotation, as shown by arrow 83, 84, 84' are the diametrically opposite inlet ducts which form part of the suction line, and 85, 85' are the diametrically opposite outlet ducts, which form part of the pressure line. Inlet duct 84 and outlet duct 85 here occupy equal arcs of the circumference of the path described by the projections of members 13, 14.

Fig. 16 can also be considered as a motor operated by incompressible fluids. In this case the inlet ducts 84, 84' form part of the pressure line; and the outlet ducts 85, 85' are connected with a line leading to the outside, or broadly with a line of lower pressure.

In the embodiments previously described the inside surface of the stationary housing, that is the surface of revolution which encloses the path of the wing-like projections of the coaxial members 13, 14, comprises a cylindrical surface concentric with said members. Other shapes may however also be used. Fig. 17 shows an embodiment where the inside surface 87 of housing 88 is a spherical surface. Likewise the outside surface of the wing-like projections 89, 90 of the coaxial rotatable and oscillatory members 91, 92 is a spherical surface.

Figures 18 and 19 show a modification of the structure shown in Fig. 12 for obtaining oscillation of the rotatable members having wing-like projections.

A planetary bevel pinion 93 and an oppositely disposed planetary bevel pinion 94 are mounted on rotary member 40' which is adapted to transmit power between the outside and the interior parts of the positive displacement machine. Member 40' acts also as a fly-wheel, and in operation turns at a substantially uniform rate. Pinions 93 and 94 mesh with a stationary bevel gear 95, which has twice as many teeth as a bevel pinion 93 or 94. They make therefore two turns on their axes per complete turn of member 40'.

Bevel pinion 93 contains an eccentric hole 96 whose center line is inclined to the pinion axis and passes through the pinion apex. This hole is engaged by a pin 97 of a forked lever 98, which is pivoted at 99 and 100 (Fig. 19) on a fork 101 which operatively forms part of a member that corresponds to member 13 of Fig. 12, and is one of the two coaxial members which are adapted to oscillate as they rotate, and which contain wing-like projections as described.

Bevel pinion 94 contains an eccentric hole 102 whose center line also passes through the pinion apex. The angle included between said center line and the pinion axis is the same on both pinions 93 and 94. Hole 102 is engaged by a pin 103 of a forked lever 104, which is pivoted at 105 on an element 106. Element 106 operatively forms part of a rotatable member, which corresponds to member 14 of Fig. 12. It is enclosed in housing 108, and is not shown in the drawing.

The center line of the pivot of the forked lever 104 is disposed at right angles to the machine center line. Likewise the center line of the pivot of forked lever 98, in other words the center line of the pins 99, 100, is also disposed at right angles to the machine center line.

Forked levers 98 and 104 are in effect spherical links, having link axes disposed at right angles and intersecting one another on the machine center line, namely at the apex of the aforesaid planetary pinions. The two link axes of forked lever 98 are the center line of pivot 99—100, and the center line of pin 97, which both intersect at apex 109. The two link axes of forked lever 104 are the pivot center line and the center line of pin 103, which also intersect at apex 109.

The means described with reference to Figures 18 and 19 may be used broadly for operatively interconnecting two rotatable elements having angularly disposed and intersecting axes so that one of said elements oscillates on its axis while the other rotates at a uniform rate. Pinion 93 and fork 101 are two such elements. In this connection it does not matter whether element 93 is a planet or whether it is mounted on fixed centers. The uniformly rotating element 93 is connected by a spherical link 98 with the other 101 of said two elements which oscillates on its axis. Said axis coincides with the machine center line. All the four axes of the spherical linkage intersect in one point, the aforesaid apex 109. They comprise the turning axes of said two elements and the two link axes. On the uniformly rotating element the turning axis and the link axis include an acute angle with one another. On the other of said two elements the turning axis and the link axis are disposed at right angles.

Figures 18 and 19, as well as Figures 12 and 13, show positions corresponding to Fig. 4, that is positions where the wing-like projections of the two oscillating members are disposed instantaneously at right angles to each other.

Figures 12 and 13 also show means for operatively interconnecting two rotatable elements so that one of said elements oscillates while the other rotates at a uniform rate. Precisely the same motions are produced in both cases, provided that the angle included between the turning axis (42 in Fig. 12) and the link axis (47 in Fig. 12) is the same in both cases on the uniformly rotating element. The two cases are kinematically equivalent. The arcuate sliding block 48 (Fig. 12) can also be considered as a spherical link; and the spherical linkage again contains four axes which intersect in one point, namely in apex 43.

Figures 20 and 21 show one of the aforesaid oscillating members individually. Fig. 20 is a view and section along lines 20—20 of Fig. 21.

Member 13" is rotatable on an axis 15. It contains a hub portion 111 which may be provided with clutch teeth or splines 112 at one end. Two diametrically opposite wing-like projections 113, 114 extend radially and axially of said hub portion. These projections may be hollow, as shown, and may be provided with plane sides 115, 116, and cylindrical outside and inside surfaces 117, 118. In most cases the outside and side surfaces 117, 116 contain grooves or slots 120 in which sealing elements are disposed. The sealing elements correspond to the piston rings in reciprocating engines.

A U-shaped sealing element is shown in Fig. 22. In operation this sealing element is pressed outwardly, towards the cylinder wall, by centrifugal force.

L-shaped sealing elements 121, see also Fig. 23, represent another embodiment. The U-shaped slots 120 contain a pair of interlocking L-shaped sealing elements 121 per slot. They are pressed against the plane sides of the housing by leaf springs 122, one of which is also shown in Fig. 23. A spring 122 may consist of a single leaf having a constant and usually rectangular cross section throughout its length.

In operation the L-shaped sealing elements are pressed laterally by spring means, and outwardly by centrifugal force. The outward force may be increased by spring means if desired.

The inside cylindrical surface 118 is preferably provided with a multitude of grooves 123 which run parallel to the axis of rotation and oscillation 15. These grooves may be merely cast. Turbulence is here relied on for sealing, as on known labyrinth seals.

The length of the ducts 124 on the cylindrical inside surface of the stationary housing should be smaller than the length of the sealing elements, as shown in Fig. 21, so that the sealing elements are supported at both ends when they ride over the duct openings.

Fig. 24 shows a further modification of my invention as applied to internal combustion motors of the four cycle type.

It comprises a stationary housing 125, two coaxial rotatable members 126, 127 having wing-like projections, a rotary member 128 coaxial with said two members and adapted to transmit power, four planetary bevel pinions 130 mounted on member 128 and of which two are shown in Fig. 24, a stationary bevel sun gear secured to the housing 125 by a toothed clutch or splines and meshing with said pinions and means for oscillating members 126, 127 with respect to member 128 during the rotation of the latter. These elements correspond to the elements described at more length with reference to Fig. 12.

Member 128 acts as a fly-wheel, and is part of a friction clutch of known construction. The clutch is kept in engagement by spring means, as customary on automotive clutches, and it may be disengaged by moving sleeve 132 axially, to the left in Fig. 24.

Member 128 is journalled on bearing 133, and in the driven shaft, which in turn is journalled on bearing 134.

Member 126 is shown in an axial section particularly in the upper portion of Fig. 24, while the portion below the center line of the motor shows a section through the wing-like projection of the other oscillating and rotating member 127.

Member 126 differs from the corresponding members 13, 13'' previously described by having a ring shaped member 136 attached to it at the end opposite to the hub portion 137. It contains a disc portion 138 and a hub-like portion 139. One function of ring shaped member 136 is to reinforce the projections of member 126 by supporting them at their ends.

Ring shaped disc 140, which is secured to the projections of member 127 serves said same purpose on member 127.

Such reinforcement is not confined to motors, but may be used broadly wherever desired.

Fig. 24 further illustrates a design, in which the projections of the rotating and oscillating members 126, 127 of a motor are internally cooled, namely by air.

Cooling air of atmospheric pressure, or precompressed air enters at 142 and 143. Passage 142 follows the center of shaft 144 which is rigidly secured to member 127 and which is operatively connected with planetary pinions mounted on member 128, namely with the two pinions not shown in Fig. 24. The air enters the inside of projection 145 of member 127 through passage 146, and leaves through passage 147. It then flows to the right, following the center of hollow shaft 144. After passing through said central passage the air enters radial passages 148 provided in member 128, and leaves member 128 through openings 149 on the outside of said member.

Passage 143 is provided in ring shaped member 136, and leads directly to the inside of a wing-like projection of member 126, to which member 136 is rigidly secured, for instance by bolts. The air leaves said projection at the hub portion and enters the inside passage of shaft 144 through an opening 150. It then flows to the right to member 128, and leaves said member through the aforesaid radial passages 148 and openings 149.

What has been described for one of the wing-like projections of member 126 and of member 127 also applies to the other wing-like projections, that is to the projections which are diametrically opposite to the ones shown in Fig. 24. Thus there are two diametrically opposite passages 143 provided in ring shaped member 136. They do not both show up in the drawing because the upper and lower half sections to the left of bearing 133 are taken through the projections of member 126 and of member 127 respectively, and are therefore not diametrically opposite.

In operation the radial passages 148 of the rotating member 128 act somewhat like a centrifugal pump, and cause an outward air stream in said passages. Thus air is drawn in at the left, through passages 142, 143, and an ample stream of air circulates through the inside of the described wing-like projections. Liquid cooling of said projections can also be used if desired.

Liquid cooling may of course also be applied to housing 125. 152 denote cooling ducts for cooling the housing by liquid, for instance water. Most intensive cooling is applied to the parts of the circumference where the most heat is developed.

Fig. 25 illustrates a way of using a plurality of motors 160, 161, 162, 163 for transmitting power to a shaft 167 by means of bevel pinions 165 and bevel gears 166.

The little circles and the dotted line shown with each motor are a diagrammatic description of the timing, intended particularly for motors of the four cycle type. The dotted line corresponds to line 27 of Figures 3 to 11, and the circles symbolically represent the circumference of the motor housing.

The turning position of motor 160 is thus indicated to correspond to the position of Fig. 3, where line 27 has the same direction as the dotted line shown with motor 160.

At the same moment the turning position of the opposite motor 161 corresponds to Fig. 4. This change of timing is provided for more nearly equalising the torque delivered to shaft 167, by having the instantaneous maximum torque of each motor delivered at different moments.

At the same moment the turning position of motor 162 corresponds to a position intermediate the positions shown in Figures 3 and 4, as indicated by the direction of the dotted line; and the turning position of motor 163 corresponds to a position intermediate the positions shown in Figures 4 and 5.

In this manner the fluctuations of the torque delivered to shaft 167 can be kept to a minimum.

The above said principles are also applicable to other motors and to compressors.

Although positive displacement machines constructed according to my present invention differ vastly from reciprocating machines employing cylinders and pistons, there is nevertheless a broad similarity of function in both classes of positive displacement machines. And all the known modifications of function can be directly transferred from reciprocating machines to positive displacement machines of the character here disclosed.

Numerous further changes and modifications may be made in my invention without departing from its spirit. For definition of its scope reliance is placed upon the appended claims.

I claim:

1. A positive displacement machine, comprising a stationary housing, two coaxial members rotatable therein and containing wing-like projections forming pockets between one another and said housing, a rotary member coaxial with the first named two members, and means for moving at least one of the first two members alternately toward and from the other as the first two members rotate in the same direction, thereby to increase and decrease periodically the volume of said pockets, said means comprising a stationary gear coaxial with said members, a gear meshing with said stationary gear and rotatably mounted on said third member with its axis angularly disposed to and intersecting the axis of said members, and means operatively connecting said last named gear to one of the first two members to impart a relative oscillatory motion at a varying velocity to said member as the last-named gear rotates.

2. A positive displacement machine, comprising a stationary housing, two coaxial members rotatable therein and containing wing-like projections forming pockets between one another and said housing, a rotary member coaxial with the first named two members, and means for moving the two first-named members toward and from one another an integral number of times per complete revolution of the third member as the two first-named members rotate in the same direction, said means comprising a stationary gear coaxial with said members, two gears meshing with said stationary gear and rotatably mounted on said third member with their axes angularly disposed and intersecting the axis of said third member, and means operatively connecting each of the two last-named gears to one of the two first-named members to impart an oscillatory motion at a varying velocity to said members as they rotate, said connections being such that the oscillatory motions imparted to the two first-named members are exactly alike but opposite in phase.

3. A positive displacement machine, comprising a stationary housing, two coaxial members rotatable therein and containing wing-like projections forming pockets between one another and said housing, a rotary member coaxial with said two members, planetary pinions mounted thereon on axes interesecting the axis of said rotary member at right angles, a stationary sun gear coaxial with said members and meshing with said pinions and having a number of teeth which is an exact multiple of the tooth number of each of said pinions, means operated by said planetary pinions for moving the two first-named members alternately toward and from one another as they rotate in the same direction whereby said pockets periodically increase and decrease in volume, and ducts provided in said housing to admit fluid to and release fluid from said pockets.

4. A positive displacement machine, comprising a stationary housing, two coaxial members rotatable therein and containing wing-like projections forming pockets between one another and said housing, a rotary member coaxial with said two members, planetary bevel pinions mounted thereon on axes disposed at right angles to the axis of said rotary member, a stationary bevel sun gear coaxial with said members and meshing with said pinions and having twice as many teeth as a pinion, a crank pin operatively forming part of each of said pinions and having a center line passing through the apex of its bevel pinion, and means for connecting the crank pins to the two first-named members to move the two first-named members toward and from one another as they rotate in the same direction.

5. Means for operatively interconnecting two rotatable elements having angularly disposed and intersecting axes so that one of said elements moves at a varying velocity on its axis while the other rotates at a uniform rate, comprising a member which is connected to the two elements for rotation and oscillation relative thereto about two separate axes which are angularly disposed to each other, both of which axes pass through the point of intersection of the axes of the two elements, the axis of rotary connection of said member with one element being inclined at an acute angle to the axis of said element.

6. Means for operatively interconnecting two rotatable elements having intersecting axes disposed at right angles to each other so that one of said elements moves at a varying velocity on its axis while the other rotates at a uniform rate, comprising a member which is connected with one of said elements for rotation relative thereto about an axis extending at an acute angle to the axis of said element and which is connected with the other of said elements for oscillation relative thereto about an axis intersecting at right angles the axis of the latter element.

7. Means for operatively interconnecting two rotatable elements having intersecting axes disposed at right angles to each other, comprising a member which is connected with one of said elements for rotation relative thereto about an axis extending at an acute angle to and intersecting the axis of said element in the point of intersection of the axes of said elements and which is connected to the other of said elements for oscillation relative thereto about an axis intersecting at right angles the axis of the latter element and passing through the point of intersection of the axes of the two elements.

8. In apparatus of the character described, a housing, a pair of coaxial members rotatably mounted in said housing, each of said members having two wing-like projections, said projections forming pockets with each other, a third member mounted for rotation about an axis coinciding with the axis of the first two members, and means operatively connecting the first two members with the third member comprising a gear secured to the housing coaxial of said members, a pair of pinions meshing with the gear and mounted on the third member for rotation thereon about a common axis angularly disposed to the axis of said members, a connecting member connected to each of the first two members to oscillate about an axis perpendicular to the axis of said members, and means rotatably connecting the two connecting members to the two pinions, respectively, at points offset at opposite sides, respectively, of the common axis of the two pinions, to produce alternate acceleration and deceleration of rotation of said two members on uniform rotation of the third member, and means for admitting fluid to and exhausting it from between said first two members.

9. In apparatus of the character described, a housing, a pair of coaxial members rotatably mounted in said housing, each of said members having two wing-like projections, said projections forming pockets with each other, a third member mounted on the housing for rotation about an axis coinciding with the axis of the first two members, and means operatively connecting the first two members with the third member comprising a gear secured to the housing coaxial of said members, a pair of pinions meshing with said gear and mounted on the third member for rotation about axes angularly disposed, respectively, to the axis of said members, a connecting member connected to each of the first two members to oscillate about an axis perpendicular to the axis of said members, and pins rotatably connecting the two connecting members, respectively, to the two pinions, said pins being eccentric of the axes of the two pinions, respectively, and being disposed 180° apart about the axes of their respective pinions, and means for admitting fluid to and exhausting it from the pockets between said projections.

10. In apparatus of the character described, a housing, a pair of coaxial members rotatably mounted in said housing, each of the members having two wing-like projections, said projections forming pockets with each other, a third member mounted for rotation about an axis coinciding with the axis of the first two members, and means operatively connecting the first two members with the third member comprising a gear secured to the housing coaxial of said members, a pair of pinions meshing with the gear and mounted on the third member for rotation about axes which are perpendicular to the axis of said members, a connecting member connected to each of the first two members to oscillate about an axis perpendicular to the axis of said members, and pins forming rotatable connections, respectively, between each of the connecting members and one of the pinions, each of said pins being eccentric of the axis of its connected pinion and being disposed to said axis at an acute angle less than the pitch angle of the pinion, the two pins being disposed at 180° apart about the axes of the two pinions, and means for admitting fluid to and exhausting it from said housing between said pockets.

11. In apparatus of the character described, a housing, a pair of coaxial members rotatably mounted in said housing, each of said members having two wing-like projections, said projections forming pockets with each other, a third member mounted for rotation about an axis coinciding with the axis of the first two members, and means operatively connecting the first two members with the third member comprising a gear secured to the housing coaxial of said members, a pair of pinions meshing with the gear and mounted on the third member for rotation about axes, which lie in a common plane and which are angularly disposed to the axis of said members, a connecting member connected to each of the first two members, a pin carried by each of the pinions, eccentrically of the axis of the pinion, and a block rotatably mounted on each pin, each of the connecting members having a slot therein, which is curved about the point of intersection of the pinion and gear axes and in which the block is adapted to travel, the two pins being so positioned that they are spaced 180° apart around the axes of the two pinions, and means for admitting fluid to and exhausting it from said housing between said pockets.

ERNEST WILDHABER.

REFERENCES CITED

The following references are of record in the file of this patent:

UNITED STATES PATENTS

| Number | Name | Date |
|---|---|---|
| 895,043 | Rossbach-Rousset | Aug. 4, 1908 |
| 993,960 | Carroll | May 30, 1911 |
| 1,095,034 | Sanchez | Apr. 28, 1914 |
| 1,440,451 | Ford | Jan. 2, 1923 |
| 1,497,481 | Bullington | June 10, 1924 |
| 1,603,630 | Morris | Oct. 19, 1926 |
| 2,071,528 | Hover | Feb. 23, 1937 |
| 2,075,654 | Martin | Mar. 30, 1937 |
| 2,085,505 | Murakami | June 29, 1937 |

FOREIGN PATENTS

| Number | Country | Date |
|---|---|---|
| 14,828 | Great Britain | June 20, 1910 |
| 102,743 | Australia | Dec. 13, 1937 |
| 420,781 | Germany | Oct. 31, 1925 |